US006980677B2

(12) United States Patent
Niles et al.

(10) Patent No.: US 6,980,677 B2
(45) Date of Patent: Dec. 27, 2005

(54) METHOD, SYSTEM, AND COMPUTER CODE FOR FINDING SPOTS DEFINED IN BIOLOGICAL MICROARRAYS

(75) Inventors: Richard K. Niles, San Francisco, CA (US); Christine L. Martens, Portola Valley, CA (US); Darach B. Foskett, San Francisco, CA (US)

(73) Assignee: Niles Scientific, Inc., Portola Valley, CA (US)

( * ) Notice: Subject to any disclaimer, the term of this patent is extended or adjusted under 35 U.S.C. 154(b) by 635 days.

(21) Appl. No.: 10/155,781

(22) Filed: May 24, 2002

(65) Prior Publication Data

US 2003/0219150 A1 Nov. 27, 2003

(51) Int. Cl.[7] .............................................. G06K 9/00
(52) U.S. Cl. ............................. 382/128; 435/9; 436/63
(58) Field of Search ........................ 382/128, 12, 130, 382/131, 132, 133, 134, 254, 261, 262, 263, 382/264, 265, 266, 322, 129; 435/6, 9, 30, 435/32, 34, 7.1, 7.2; 422/50, 52, 56, 57; 424/50, 424/52, 56; 436/63, 74, 519; 607/35

(56) References Cited

U.S. PATENT DOCUMENTS

| | | | |
|---|---|---|---|
| 5,236,825 A * | 8/1993 | Iverson et al. ............. 435/68.1 |
| 5,807,522 A * | 9/1998 | Brown et al. .................. 422/50 |
| 6,101,946 A | 8/2000 | Martinsky |
| 6,110,426 A | 8/2000 | Shalon et al. |
| 6,252,236 B1 | 6/2001 | Trulson et al. |
| 6,539,102 B1 * | 3/2003 | Anderson et al. ........... 382/128 |
| 6,607,886 B2 * | 8/2003 | Hovig et al. .................... 435/6 |
| 6,699,710 B1 * | 3/2004 | Kononen et al. ......... 435/283.1 |

OTHER PUBLICATIONS

Derisi et al., "Use of a cDNA microarray to analyse gene expression patterns in human cancer" Nature Genetics 14:457-460 (1966).
Eisen, et al. "DNA Arrays for Analysis of Gene Expression" Methods of Enzymology 303: 179-205 (1999).
Schena et al. "Parallel Human Genome Analysis: Microarray-Based Expression Monitoring of 1000 Genes" Proc. Natl. Acad. Sci. USA 93:10614-10619 (1996).
Schena et al. "Quantitative monitoring of gene expression patterns with a complementary DNA microarray" Science 270:467-470 (1995).

* cited by examiner

*Primary Examiner*—Kanjibhai Patel
*Assistant Examiner*—Abolfazl Tabatabai
(74) *Attorney, Agent, or Firm*—Townsend and Townsend and Crew LLP

(57) ABSTRACT

A method (and system) for using information contained within the scanned image to create, in an automated (or semi-automated) process, an accurate data grid. The process has steps: enhance the image; locate blocks of spots; and find each individual spot in each of the blocks. Preferably, the method makes use of image filtering using a "Principal Frequency Filter" based on a mathematical determination of major periodic elements in the image to eliminate noisy, non-periodic signals, and of smoothed intensity profiles of the filtered image data. Here, the term Principal Frequency Filter is used to indicate an image-enhancing filter based upon a mathematical operation which identifies the major periodic components of the image.

49 Claims, 6 Drawing Sheets

Figure 1. Definition of terms
This is a representation of a microarray slide showing spots grouped into blocks. Rows and columns may have any number of spots in them. They need not be square. There may be any number of blocks on the array.
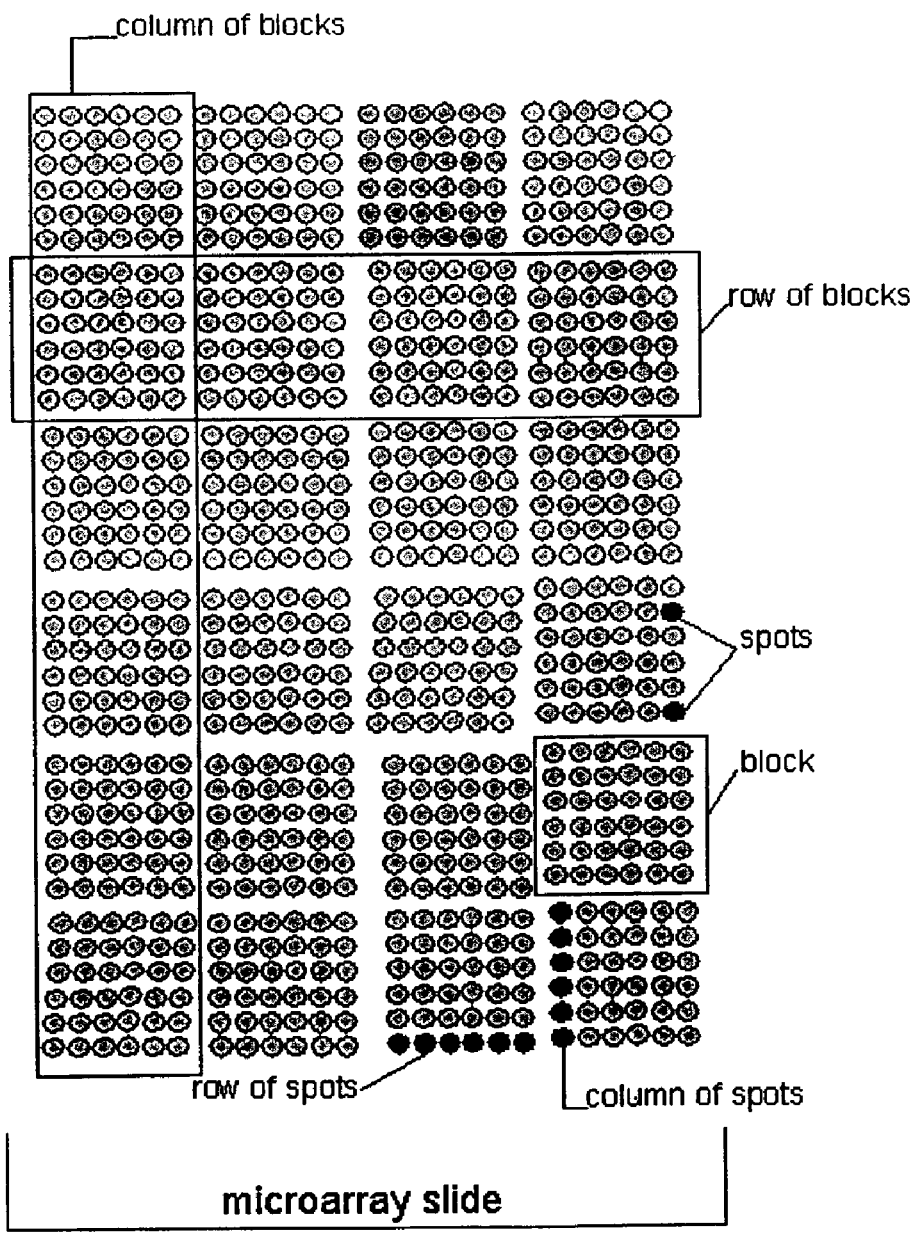

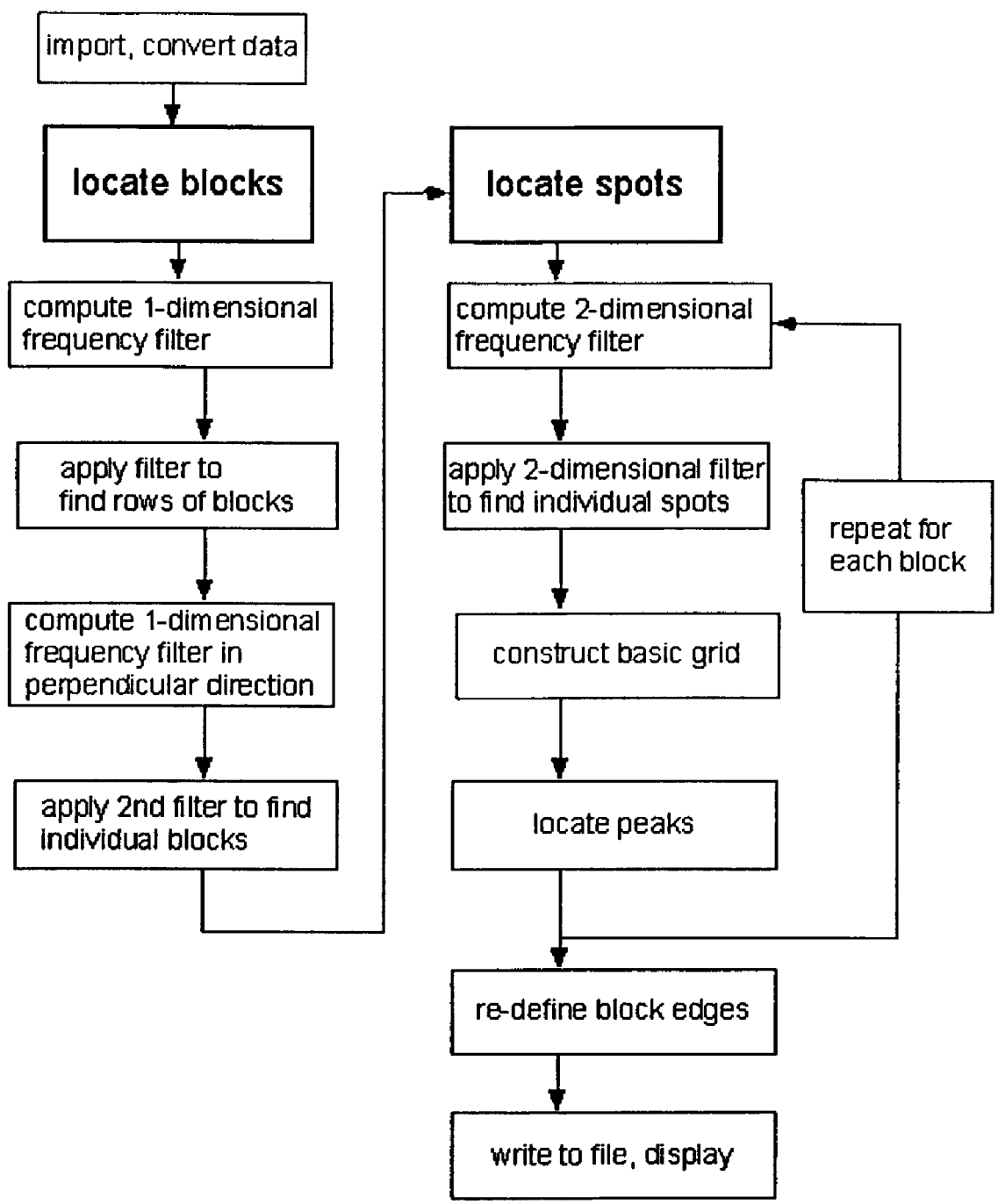
Figure 2. Process overview

Figure 3.Intensity profiles demonstrating effects of smoothing and PF filtering
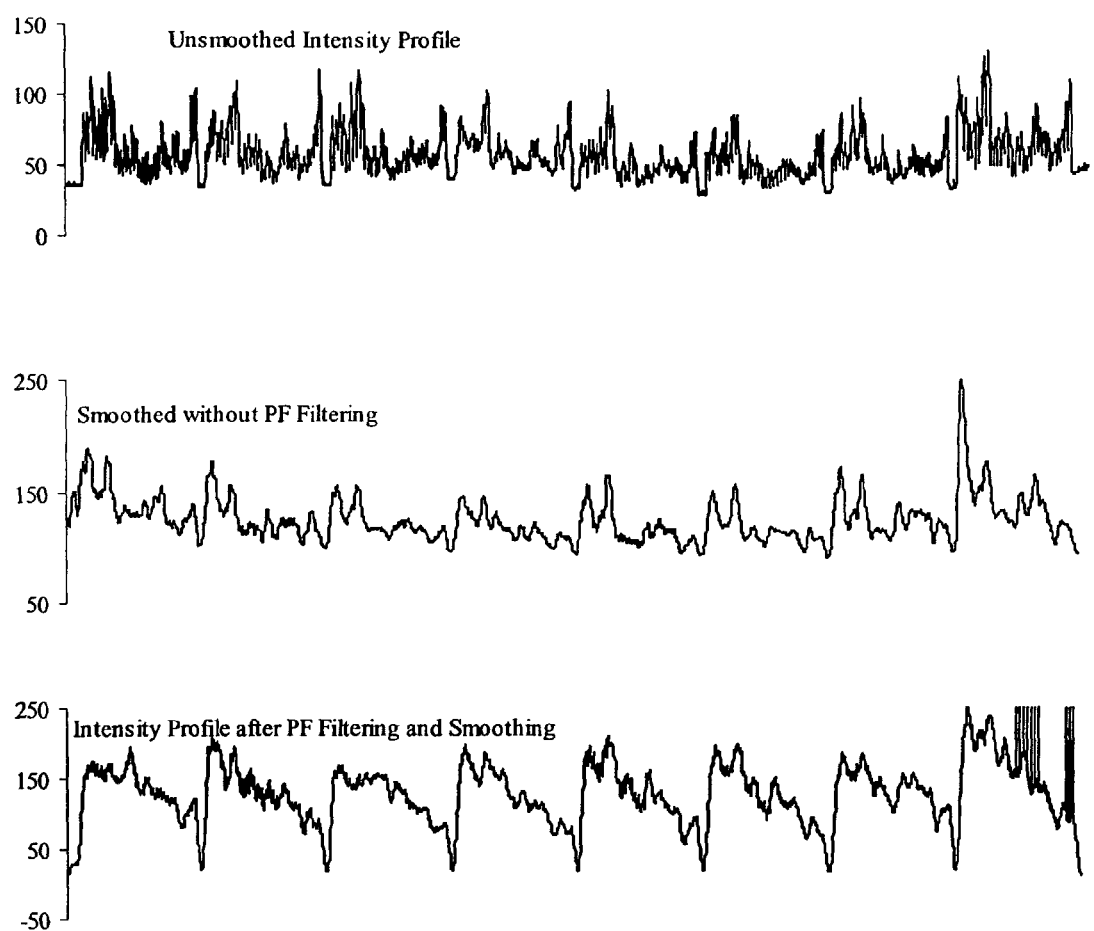

Figure 4. Captured image of one microarray block, power spectrum derived from it, and expanded view of central area of power spectrum showing arrangement of high-intensity pixels near origin
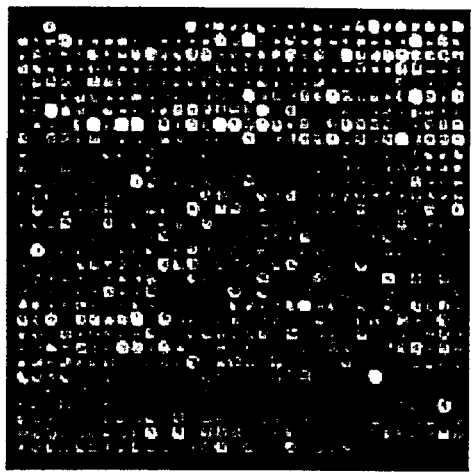
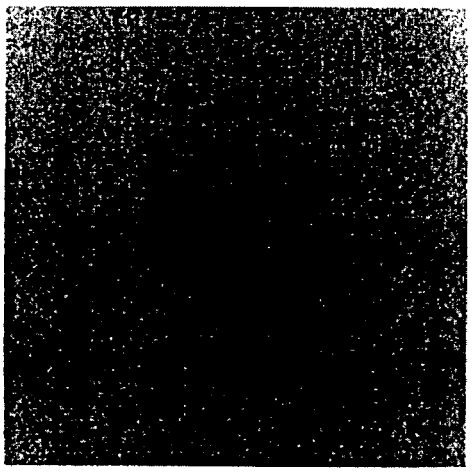
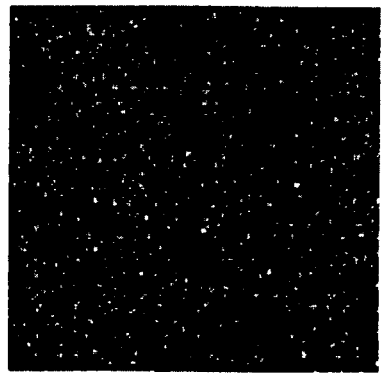

Signal acquisition system

Figure 6. Computer Hardware
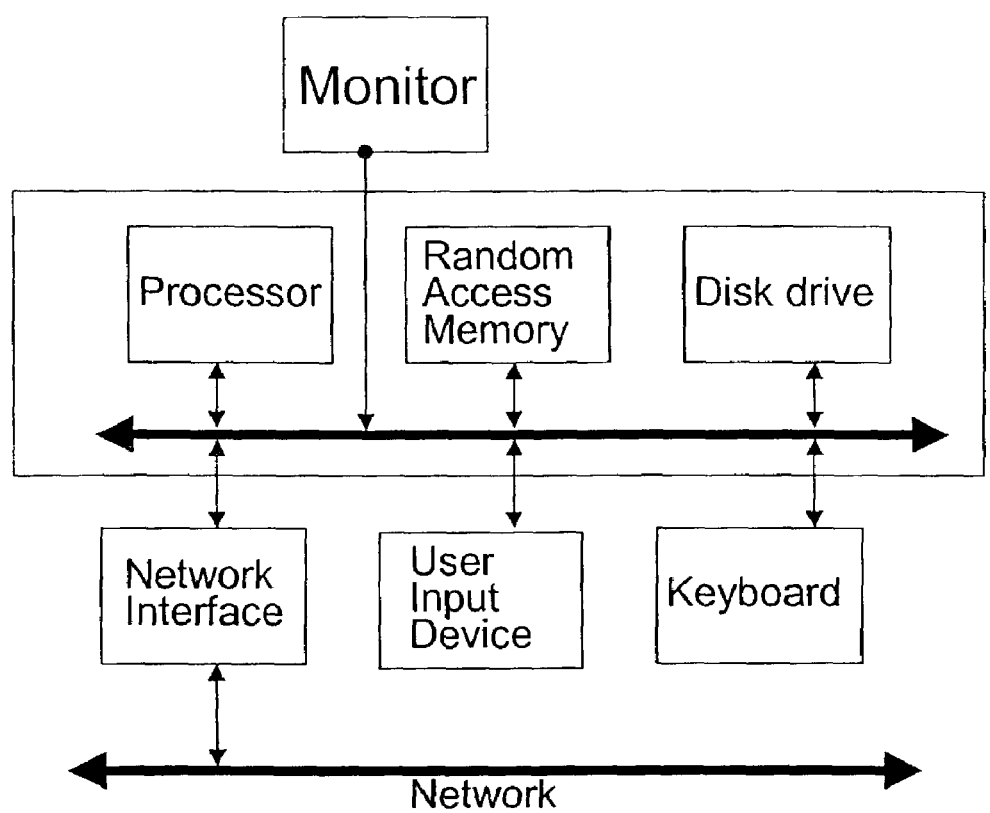

METHOD, SYSTEM, AND COMPUTER CODE FOR FINDING SPOTS DEFINED IN BIOLOGICAL MICROARRAYS

BACKGROUND OF THE INVENTION

The present invention relates generally to processing techniques for data from biological microarrays. More particularly, the invention provides one or more methods for identifying areas on images of a mechanically printed or otherwise generated array of spots which contain data, and those which are background areas. Merely by way of example, the invention is applied to processing images of DNA microarrays to distinguish and demarcate the data-containing areas known as spots from the background areas. But it would be recognized that the invention has much broader range of applicability including analysis of images of arrays of any kind in which data-containing areas lie in an approximately regular pattern on a background.

Microarray technology has been developed over the past few years to allow scientists to test large numbers of genes, proteins, or other molecules for hybridization or binding to molecules in a test mixture (see, for example, DeRisi et al., "Use of a cDNA microarray to analyse gene expression patterns in human cancer," Nature Genetics 14:457–460 [1966]; Schena et al., "Parallel Human Genome Analysis: Microarray-Based Expression Monitoring of 1000 Genes," Proc. Natl. Acad. Sci. USA, 93:10614–10619 [1996]; Schena et al., "Quantitative monitoring of gene expression patterns with a complementary DNA microarray," Science 270:467–470 [1995]). As large numbers of genes have been identified by the sequencing of the genomes of various organisms, scientists have gained the ability to assess the total range of gene expression in cells of different types or at different stages of differentiation or cell cycle. By comparing gene expression in closely related cells which exhibit distinct phenotypes, for example malignant and nonmalignant cells from the same tissue origin, correlations may be drawn between gene expression and phenotype. Understanding these relationships may lead to identification of new drug targets or other therapeutic interventions for a variety of diseases.

A type of microarray experimental design uses spots of DNA immobilized on glass slides, or "chips." These spotted DNA microarrays have been developed as a way of testing for expression or presence of large numbers, often tens of thousands, of DNA or RNA sequences using various types of hybridization experiment. To make a spotted DNA microarray, preparations of complementary DNA are made from the messenger RNA or genomic DNA which represent the sequences of many of the genes (or a defined subset thereof) found in the organism of interest. These preparations are held in plates which are divided into many (usually 96 or 384) wells, each of which may hold from 50 $\mu$l to 200 $\mu$l of DNA in solution. Wells are often identified by position on the plate, and the identity of the DNA sequence in each well is recorded in a list. Droplets of each of the DNA preparations are typically deposited onto transparent slides in regular arrays, often by dipping pins or capillaries into the DNA solution and touching the pins to the surface-treated slide. The DNA is thus fixed in small (50–250 $\mu$m), approximately circular areas on the surface of the slide, in a known arrangement such that the identity of each spot can be determined by correlation with the list of sequence names.

Arrays prepared in this manner can be used as a substrate for hybridization experiments to test for the presence or absence of complementary DNA or RNA sequences in a test mixture. A useful application of this type of microarray is to interrogate gene expression in cells, usually comparing the RNA isolated from two or more different sources, for example, a test and a control. A total population of messenger RNA molecules from each origin is labeled with a distinct fluorescent tag, with or without a reverse transcription and amplification step. The labeled nucleic acid preparations are often allowed to hybridize to the immobilized spots of DNA on the chip; specific hybridization occurs where the DNA contains sequences that are homologous to sequences of labeled test nucleic acid. After washing away unbound material, the fluorescent signals from the tags can be detected by a scanning fluorimeter. This instrument generates a data file that contains numeric information about the intensity of emitted light at the wavelength that is generated by the fluorescent dye used to tag the test nucleic acid. Data are collected for each pixel of the scanned area, with number of pixels determined by the size of the chip and the resolution of the scanner. The file containing the data can be converted into an image, which often represents the pattern of emitted fluorescence on the microarray chip.

In order to use information from these spotted DNA microarray images, considerable data processing is generally required. A step in the process is to determine which pixels in the image represent areas where DNA spots were deposited, and which pixels contain only background fluorescence, so that fluorescence intensity data may be extracted from each data-containing site. It is generally desirable to identify the location of each and every DNA spot on the image, regardless of whether a positive fluorescent signal is present at that spot, so that fluorescence signals can be correlated with the identity of the gene represented by each spot. To do this, analysis software ordinarily creates a grid, or a layout of areas each of which encloses the pixels that represent DNA spots. Such a grid is commonly defined as a perfect mathematical grid. Fluorescence intensity of pixels within each spot, adjusted for the intensity of background pixels in the immediate neighborhood, is the first piece of information needed to interpret results. Thus, locating the grid of spots accurately is generally important to obtaining legitimate data from an array. Conventional analysis programs construct simple rectilinear grids based on information provided by the user, such as number of blocks, number of rows and columns of spots, spot size, column and row spacing, and degrees of rotation of each block. Often, this information is difficult to obtain or is slightly (or considerably) inaccurate, and may even be variable within a single microarray image. Grids made in this way are created as perfectly spaced and perfectly aligned circles, without reference to the actual image being analyzed, which makes them limiting. Other limitations also exist.

The manufacture of spotted arrays, however, does not produce perfect rectilinear arrays. A commonly used method for array preparation makes use of a pin-type robotic printer, see for example U.S. Pat. No. 6,101,946, in the name of Martinsky, assigned to TeleChem International Inc. (Sunnyvale, Calif.), and Eisen and Brown, Meth. Enzymol. 303:179–205 (1999), or http://cmgm.stanford.edu/pbrown/mguide/index.html, or a capillary-type robotic printer, see for example U.S. Pat. No. 5,807,522, in the name of Brown, P. O., assigned to The Board of Trustees of the Leland Stanford Junior University (Stanford, Calif.), and U.S. Pat. No. 6,110,426, in the name of Shalon, assigned to The Board of Trustees of the Leland Stanford Junior University (Stanford, Calif.). This type of instrument generally has a group of metal pins or capillaries, numbering from one to 48, which dip into DNA preparations contained in multiwell plates. The pins then move rapidly over an arrangement of many (often 100 to 200) glass slides, laid out on a flat table, touching each slide to deposit a droplet of DNA. The pattern of DNA spots that is created in this way approximates a regular, rectilinear grid. However, irregularities in the grid of DNA spots occur due to many factors, including variations in the size and thickness of the glass slides, minute differences in the distances between pins or capillaries in the set, minute differences in the bore size among the set of capillaries or diameter among the set of pins, variable precision of the distances traveled by the set of pins or capillaries when moving from one slide to another, and inconsistency of DNA concentration and thus viscosity among the thousands of DNA samples. Further irregularity in the arrangement of spots on the array can occur when the robot stops periodically during the printing run for replacement of the multiwell DNA plate or for other types of instrument maintenance. When multiplied over tens of thousands of spots, even minuscule variation results in DNA arrays which are not perfectly rectilinear. Even the best spotted arrays contain irregularities that make creation of the data analysis grid a challenge. Furthermore, within the area of a given spot, there are often irregularities in the fluorescence intensity of pixels, leading to variation in the shape of spots on the array. For this reason, and the fact that not every target site gives a positive signal, a simple blob analysis does not identify the locations of every spot. Further deviation from a perfect grid can arise during processing, for example when sections of a microarray become altered during the hybridization procedure. The coating of poly-L-lysine or other chemical, which allows the spotted DNA to adhere well to the surface of the glass slide, can lift and shift its position, leading to changes in the arrangement of rows and columns of DNA spots. These spots may still provide valid hybridization information, but because spot positions are not aligned with a simple grid, such data are often lost.

As noted above, conventional software programs commonly begin data analysis by mathematically generating a perfect rectilinear grid from user-provided information. The grid is then overlaid onto an image of the fluorescence scan of the chip. For nearly every microarray slide, a great deal of manual adjustment of these grids is often required to align accurately each and every spot on the grid with the fluorescent spots on the chip image. This adjustment process, which must be done before any analysis can be carried out, is quite time-consuming and cumbersome, and often leads to inaccuracy, as the user tires of the tedious process of adjusting the positions of hundreds or thousands of individual spots on a grid. To create automatically a grid based on the information contained in the fluorescence scan of the chip provides an improvement in the accuracy and efficiency of data analysis of microarray hybridization experiments.

Other techniques of data analysis have been developed to reduce the amount of manual adjustment of the grids to make each and every spot on the grid correlate with the fluorescent spots, although such techniques still require some manual adjustment. As merely an example, such techniques include those provided by ArrayVision, Imaging Research Inc., of 500 Glenridge Ave., St. Catharines, Ontario, Canada L2S 3A1, in which a rectilinear template is generally created and analyzed for signal intensity to determine whether a spot is present which is a likely fit to each element within the template. Statistical analysis and confidence weighting are used to help align spots. This technique, however, often leads to large misinterpretation of images of arrays containing areas of weak or absent signals, misalignments, or high background fluorescence. The Institute for Genomic Research (TIGR), of 9172 Medical Center Drive, Rockville, Md. 20850 USA, provides a program known as SpotFinder which uses a similar adaptive thresholding method to locate spots within a simple rectilinear grid. With bright spots, large features and widely separated spots, this method works fairly well, but spots on images of arrays or parts of arrays with irregular features are not accurately located and require considerable user manipulation. Another method of target site identification, using a statistical test to analyze ratiometric data in spotted arrays, has been reported [U.S. Pat. No. 6,245,517, in the name of Chen, Y., et al., and assigned to The United States of America as represented by the Department of Health and Human Services (Washington, D.C.)]. This method begins with a "target mask" inferred from landmark signals placed into the potential target area, and thus it suffers from the same limitations as described for other methods which use simple mathematical grids and statistical methods. Array Pro™ Analyzer by Media Cybernetics, Inc. of 8484 Georgia Avenue, Suite 200, Silver Spring, Md. 20910 U.S.A., utilizes a method which looks for inherent-periodicity in the clustering of spots into "grids and subgrids," using a Fourier analysis to calculate the angle of skewed blocks and the distance between spots in the image. This method makes easier the task of locating spots by suggesting row and column spacing values, but individual spots are frequently misaligned and low-signal spots are often missed altogether. The method can be made to work by expert users but is cumbersome and often unsuccessful when operated by less highly trained personnel. In all of these programs, default values may be used to carry out data analysis "automatically," but in reality, accuracy is poor if the many specific parameters of each array are not accurately entered. Unfortunately, in practice, all of such techniques usually require considerable manual inspection and adjustment in order to align each and every spot on the demarcation grid with the actual spots on the image.

From the above, one understands that it is often desired to have a technique for improved analysis of data contained in images of biological microarrays or the like.

BRIEF SUMMARY OF THE INVENTION

According to the present invention, techniques for processing images of biological microarrays are provided. More particularly, the invention provides one or more methods for identifying areas on images of a mechanically printed or otherwise generated array of spots which contain data, and those which are background areas. Merely by way of example the invention is applied to captured digital images of DNA microarrays which contain spots of active regions of biological material, which may be treated or otherwise, situated within an area of background on the substrate of the microarray. But it would be recognized that the invention has much broader range of applicability to analyze digital images of any type of molecular or cellular array utilized in any type of biological or chemical assay.

In a specific embodiment, the present invention provides a method for using information contained within the scanned image to create, in an automated (or semi-automated) process, an accurate data grid. The process has steps: enhance the image, locate blocks of spots, and find each individual spot in the blocks. Preferably, the method makes use of a power spectrum to eliminate noisy, non-periodic signals, of image filtering using a "Principal Frequency Filter" based on a mathematical determination of the major periodic elements of the image, and of smoothed intensity profiles of the filtered image data. Here, the term Principal Frequency Filter refers to a mathematical calculation of the major periodic elements in the image, which is used to enhance the image.

In an alternative specific embodiment, the invention provides a method for processing data in captured digital images of biological microarrays, such as spotted cDNA arrays hybridized with a probe of fluorescently labeled nucleic acid from one or more test cells or other source. The method receives a captured digital image of a biological microarray of spots in an electronic format, e.g., TIFF, JPEG, or other. The image reveals that the manufacture of the array of spots was subject to at least one error whereby one or more of the spots on the array itself aligns outside of a perfectly regular grid. The spots may be defined from 1 through N, where N is an integer greater than 1. Preferably, N is an integer greater than 1,000. The captured image consists of numeric data describing a characteristic of the image, that characteristic usually being intensity at each pixel of fluorescent light of a defined wavelength which is emitted under conditions of excitation with light of an appropriate wavelength. The method processes the captured image and derives spatial coordinate information for each of the spots in the digital image of the array. The spatial coordinate information includes a first coordinate and a second coordinate. The method derives location data for one or more spots in the digital image of the array, from which may be derived assay data including at least signal information for the spot. The method stores the spot location data in memory for later additional data processing of the microarray.

In an alternative specific embodiment, the invention provides a method for processing data in digital images of biological microarrays to identify one or more groupings of spots present in the microarray image. The method receives a captured image of a biological microarray of spots in an electronic format. The array itself, which is the source of the image, in most cases is composed of a plurality of groupings of spots. The groupings may be defined by 1 through N, where N is an integer greater than 1, and each of the groupings is separated by an isolation region, which is substantially free from any spots. The method processes the captured electronic image to reduce background noise. A step of identifying at least the isolation region between the groupings in the captured image using a filter applied to the captured image is included. The filter is described according to periodic components of the captured image, where the periodic components are defined by a spatial distribution of the spots in the array image. The method determines the boundaries of each grouping in the digital image of the biological microarray to isolate any one of the groupings from any one of the other groupings, and stores the locations of each grouping in the image of the biological microarray into memory.

In an alternative specific embodiment, the invention provides a system for processing data in a captured digital image of a biological microarray to identify one or more spots defined in the digital image of the microarray. The system has one or more memories in a single system or multiple systems, which may be networked. The one or more memories include a code directed to receiving a captured image of a biological microarray of spots in an electronic format. The microarray itself comprises a plurality of spots, which are defined by 1 through N, where N is an integer greater than 1. The spots are arranged in a defined pattern which approximates a two-dimensional grid, and each spot may be identified by its row and column location in the grid. Each of the spots exists on a background region, which is substantially free from any spots. A code is directed to receive a digital image of a microarray and to demarcate one or more spot regions from the background regions in the captured image, using a filter code applied to the captured image of the biological microarray. The filter code is directed to identify a major periodic component of the spots in the captured image of the biological microarray, and to enhance the image by eliminating data other than those in a small, defined neighborhood of the major periodic component. A code is further directed to relate the identified location of each spot to its row and column location in the two dimensional grid by predicting each spot's location from information about said grid and matching predicted locations with identified locations. A code is also directed to relate the one or more spots to respective one or more pieces of identifier information whereupon the identifier information uniquely identifies the spot. Depending upon the embodiment, there may be other codes as well.

In a preferred embodiment, the method processes a captured image of a biological microarray of spots in an electronic format to demarcate the covered region from the uncovered region, in order to identify the location of one or more of the spots in the captured image. The process uses an image enhancing filter applied to the captured image of the biological microarray. The filter is derived from the mathematical factors defining a periodic component of the spots in the captured image of the biological microarray. Location information may be used to relate the one or more spots to respective one or more piece of identifier information whereupon the identifier information uniquely identifies the spot. Depending upon the embodiment, there can also be other image processing techniques combined with these steps or replacing these steps.

In an alternative specific embodiment, the invention provides a method for processing data in biological microarrays to identify the location of one or more spots defined in the digital image of the microarray. The method receives an image of a biological microarray of spots in an electronic format, which is captured in a preprocessing step. The microarray itself consists of a plurality of spots defined by 1 through N, where N is an integer greater than 1. The spots are arranged in a predefined pattern which approximates a two-dimensional grid, each of the spots being identifiable by its row and column location in said grid. Each of the spots is surrounded by a region which is substantially free from any spots, which corresponds to the background region of the image of the microarray. The method processes a two dimensional representation associated with the captured image of the biological microarray using a processing filter to provide an enhanced image of the captured image. The filter may be derived from a two dimensional power spectrum calculated from the two dimensional representation associated with the captured image by selecting two of the strongest non-zero frequency components and removing other frequency components outside of a frequency domain region, or neighborhood, associated with two of the strongest non-zero frequency components. The method further processes the enhanced image to identify spatial positions of the spots in the captured image, based on a predicted grid, which may be constructed in one of two ways: first, from the two peak frequency components identified in the principal frequency filter by a matrix inversion calculation, or second, from a cross-correlation of the original image with itself. Finally, the method relates the spatial positions of the spots to respective one or more pieces of identifier information whereupon the identifier information uniquely identifies each of the spots.

In yet an alternative embodiment, the invention provides a system for processing data in biological microarrays to identify one or more spots defined in the microarray. The system has one or more memories. Such memories include a code directed to receiving an image of a biological microarray of spots in an electronic format. A code is also directed to applying a filter to the captured image of the biological microarray to derive an enhanced image of the captured image. The filter is applied to enhance a spatial characteristic of the captured image. A code also is directed to processing the enhanced image to identify spatial positions of the spots in the captured image. Depending upon the embodiment, there may be other codes as well.

In a specific embodiment, many array manufacturing methods print DNA spots in groups of approximately uniform size, e.g., blocks of 25 columns and 28 rows, though any numbers can be chosen. In some cases there may be variation in the size of blocks found on an array. Localization of spots is simplified and improved by analyzing separately each block or grouping of spots on the image of the microarray. Thus the invention first uses a procedure to locate, on the image of the microarray, the limits of each block by identifying the spaces between blocks, in which the only signals present are background noise. These spaces can be detected as troughs in a smoothed, filtered one-dimensional intensity profile which is obtained by averaging the intensity of fluorescence emission along rows or columns in the image of the microarray. However, factors often can cause a significant reduction of the depth of such intensity profile troughs: primarily, deviation of the rows or columns from the perfect perpendicular, and background noise. The invention uses processes to avoid these problems. To minimize or reduce the damping effects of rotation on the intensity profile, rows of blocks along the shorter dimension of the image are located first. Then each row of blocks is analyzed to locate individual blocks within that row.

Further, to reduce the effect of background fluorescence ("noise"), the invention uses the Principal Frequency Filter, or PFF, as will be referenced herein. Briefly, this filter is defined from the digital image of the microarray by calculating a one-dimensional Fourier transformation and deriving from it the power spectrum of each row of pixels. Preferably, spectra are averaged across all rows of pixels in the image, and all peaks that occur in a small neighborhood of defined width are located. The first local peak away from zero frequency is the Principal Frequency, which is the spatial frequency determined by the repeating spot pattern. Random, non-periodic background or noise is spread out in the Fourier domain; periodic signals are concentrated into the Principal Frequency, with little contamination of this frequency by noisy nonperiodic signals. Utilizing Fourier transformation thus separates the pattern of important signals from spurious background signals. An intensity profile is determined from the power spectra of individual rows of pixels in a small neighborhood of the Principal Frequency, which eliminates the contributions of non-periodic background. The Principal Frequency intensity profile is then smoothed by a value of 1.5 times the estimated row spacing to reduce further the impact of noise and interspot spacing on the profile. Thresholding of the filtered intensity profile identifies locations of block edges along the long dimension of the array.

Individual blocks in the image are located in each row of blocks by a similar method but interrogating columns of pixels rather than rows. Considering each row of blocks individually, the one-dimensional power spectrum is calculated for each column of pixels. Average intensity is calculated from the one-dimensional power spectrum, local peaks are found, and the Principal Frequency is identified. A filtered intensity profile is computed and smoothed by a value of 1.5 times the estimated column spacing. In the filtered intensity profile, a threshold is identified which is crossed at locations consistent with estimated block size. These locations are determined to be the block edges.

To locate individual spots within each block in the image, a two-dimensional Principal Frequency Filter is used to enhance the image in a process analogous to the one-dimensional filter used for block location. Two-dimensional Discrete Fourier Transform (DFT) is computed for each block, and the power spectrum is calculated and analyzed to find the local peaks in a small two-dimensional neighborhood. The nine highest peaks are selected, and of these, two peaks are chosen which are closest to the positive axes and away from the origin by more than a defined percentage of the image size. The image enhancing filter is defined by setting all data in the complex DFT to 0 except values within two pixels of one of these two peaks. From this modified DFT, a reverse transform is calculated to re-create an image containing only periodic signals, with noise removed. Row and column spacing of the spots may be inferred from this modified image, and from these data, a "predicted grid" is constructed, which has intersecting parallel row and parallel column lines. This grid is an idealized version of the actual array of spots, lacking any non-linear distortions or misalignments of individual spots which are found on the original image of the microarray.

The method to this point locates rows and columns of spots on the image of the microarray, regardless of their straightness or relative angle. However, individual spots on an array may be misaligned. To identify the precise position of each spot as it actually occurs in the microarray, the image is further processed as follows. Local peaks in a neighborhood of defined size are found in the filtered image and are assigned to the closest point on the predicted grid, beginning in the center of the block and proceeding in the trajectory of a growing spiral. Following adjustment of the location of each recognized spot, the grid array is reviewed to identify locations for which no peak was assigned, and such missing spots are filled by interpolation. Block edges must again be located after this process, as the use of the two-dimensional Principal Frequency Filter extends the repeating spot pattern beyond the edges of the blocks. To locate block boundaries, locations of each peak stored in the grid array are made the centers of a set of circles of radii varying from one pixel to one-half the row/column spacing. Average pixel intensity is calculated inside and outside each circle. These average intensities are accumulated for each row and column, and new intensity plots are created as in the earlier steps. Edges of each block are again identified by finding intensity thresholds that correspond to locations consistent with the predicted size.

To finish the spot-finding steps, spot locations stored in the grid array within the boundaries of the defined block are written to a file and are displayed on an image of the microarray.

Numerous benefits are achieved using the present invention over conventional techniques. In a specific embodiment, the invention can be implemented using conventional hardware and/or software technologies. Additionally, the invention provides for reduced manual operation by a user. The invention can reduce processing time required by conventional microarray data analysis techniques by a significant factor, depending on the skill of the practitioner and the quality of the printed microarray. Importantly, use of the invention results in greatly increased accuracy of the data grid, leading to improvements in the accuracy and quality of experimental data from microarray assays. This in turn leads to reduced need for replicate experiments and thus provides savings in both time and materials costs. The invention makes possible the batch processing of data from multiple microarray slides with little user input required, allowing for greater automation of the entire process, with ensuing cost and time savings. These and other benefits are described throughout the present specification and more particularly below. Depending upon the embodiment, there may be one or more or none of these benefits.

Various additional objects, features and advantages of the present invention can be more fully appreciated with reference to the detailed description and accompanying drawings that follow.

BRIEF DESCRIPTION OF THE DRAWINGS

FIG. 1 depicts simplified illustrations of "blocks," "spots," "rows/columns of blocks," and "rows/columns of spots" according to an embodiment of the present invention.

FIG. 2 is a simplified overview flow chart which briefly summarizes a process according to an embodiment of the present invention.

FIG. 3 is a simplified diagram comparing smoothed and unsmoothed intensity profiles from one array according to an embodiment of the present invention.

FIG. 4 shows a simplified 2-dimensional power spectrum of a single block of spots according to an embodiment of the present invention.

FIG. 6 is a simplified diagram of computer hardware according to an embodiment of the present invention.

DETAILED DESCRIPTION OF THE INVENTION

Figure 5:
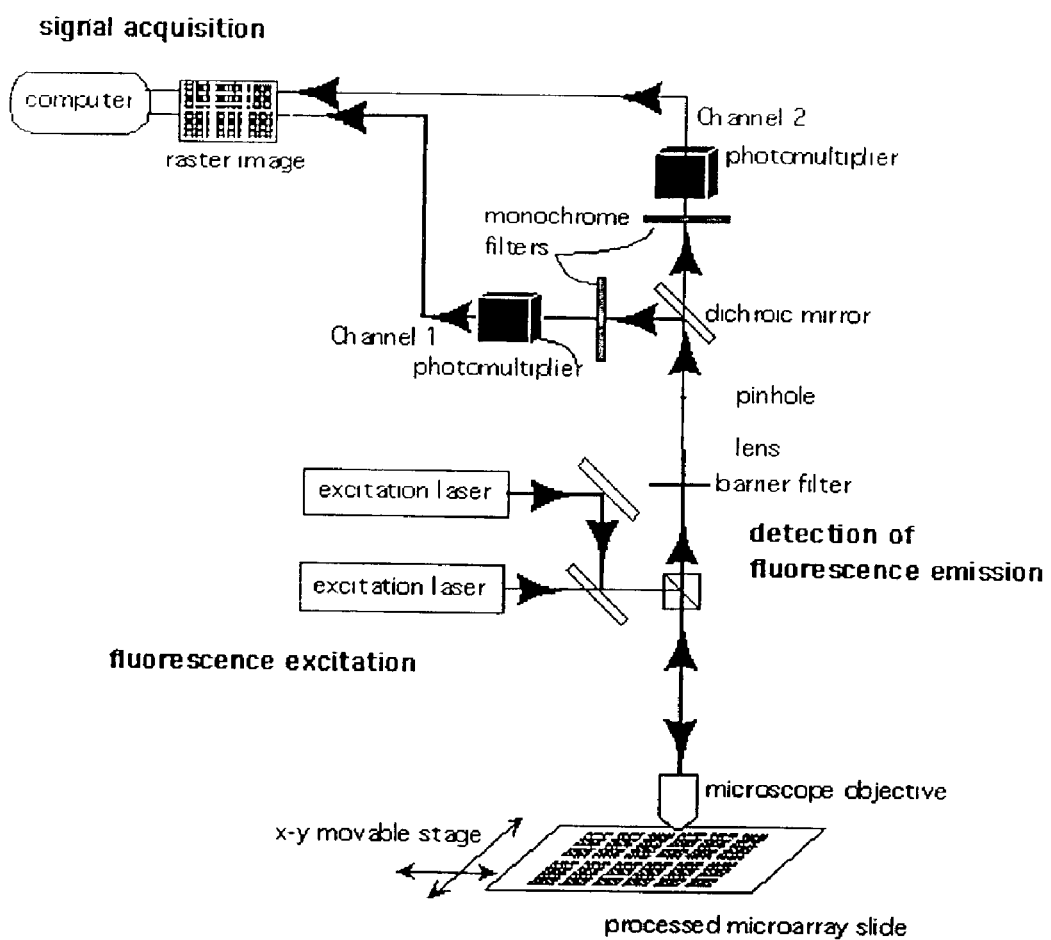
FIG. 5 is a simplified diagram of an image capturing system according to an embodiment of the present invention.

According to the present invention, techniques for processing of biological microarrays are provided. More particularly, the invention provides one or more methods for identifying areas on images of a mechanically printed or otherwise generated array of spots which contain data, and those which are background areas. Merely by way of example the invention is applied to images of spots making up DNA microarrays. Such spots on the DNA microarray itself contain active regions of immobilized nucleic acids, which may be treated or otherwise, located within inactive areas, or background regions. But it would be recognized that the methods of the invention are useful for the analysis of digitized images from any type of readout signal generated from arrays of any class of molecules, cells, or tissues in which there are areas of data and of background, and where data-containing areas lie in an approximately regular grid. Data from arrays of other classes of nucleic acids, of proteins, carbohydrates, or other biopolymers, whole cells, tissue samples, or organic or inorganic compounds synthesized in or placed into arrays, which are tested for defined characteristics or phenotype by any one of a variety of assay methods, including but not limited to binding, modification by enzyme or chemical reaction, staining with colored, fluorescent, or radioactive reagents, and the like, could be analyzed using the methods of the invention.

In a specific embodiment, the biological arrays may be composed of nucleic acid, proteins or other biopolymers, whole cells, cell extracts, tissue samples, and organic or inorganic compounds which may be used for drug discovery, drug optimization and development, discovery or optimization of enzyme substrates or inhibitors, analysis of metabolic and signaling pathways within cells or organisms, gene expression studies, studies of molecular interactions such as binding, and the like. Arrays of biological or non-biological materials may be produced by conventional or by combinatorial means, and may be subjected to testing for physical or chemical characteristics, such as interaction, oxidation or reduction, mass, viscosity, color, and the like, and the present invention may be used to identify areas of interest on such arrays as well. In addition, some types of analytical gel methods for analysis of protein, carbohydrate, or nucleic acid biopolymers, in which molecules are separated by electrophoretic or other means and assort into regular patterns that approximate a repeating-feature grid, may yield data which can be analyzed appropriately using the methods of the invention.

The following information presents a detailed description of the invention and its application to spotted array image analysis. This description is by way of an exemplary illustration of the general method of this invention. This example is non-limiting, and related variants will be apparent to one of skill in the art.

For simplicity, this disclosure is focused on and makes reference to microarrays as they are used for gene expression analysis. However, it will be understood by those of skill in the art that the methods of the invention are useful for the analysis of images generated by any type of readout signal from arrays of any class of molecules in which there are areas of data and of background, and where data-containing areas lie in an approximately regular grid. Signals which are converted into a digitized image may comprise light intensity measurements from a confocal scanning fluorescence detection apparatus as described in the example, but may also include other types of signals, including but not limited to colored or ultraviolet or infrared light, luminescence, ions, electrons, radioactivity, or other types of radiation, and may be detected by charge-coupled device (CCD) detectors, by CMOS image sensors, by instruments sensitive to radioactivity, light, temperature, ions, electrical signals, or other method. In particular, one skilled in the art will recognize that the methods of the present invention are equally applicable to analysis of digitized images of arrays of synthetic or naturally-occurring oligonucleotides, nucleic acids, proteins or other biopolymers, whole cells, cell extracts, or tissue samples which may be used for drug discovery, drug optimization and development, discovery or optimization of substrates of enzymes, analysis of metabolic and signaling pathways within cells or organisms, and studies of molecular interactions such as binding. Further, arrays of biological or non-biological materials which are tested for characteristics, such as interaction, oxidation or reduction, presence or absence of a component, phenotypic change (color, shape, and the like), or physical change (mass, viscosity, temperature, and the like) may be produced by conventional or by combinatorial means, and the present invention may be used to identify areas of interest on these arrays as well. In addition, some types of analytical gel methods for analysis of protein, carbohydrate, or nucleic acid biopolymers, in which molecules are separated by electrophoretic or other means and assort into regular patterns that approximate a rectilinear grid, may appropriately be analyzed using the methods of the invention.

The invention is a method for using information contained within a scanned image from a device such as a microarray, in which there are areas containing data and areas containing background, and where the data-containing areas fall into approximately regular grids or blocks of discrete spots. This method creates, in a truly automated process, an exquisitely accurate grid delineating areas containing data, as distinct from background. The process has steps, first, to enhance the image, then to locate blocks of spots, and finally to locate accurately each individual spot in each of the blocks.

Detect rows of blocks on the array. To begin analysis, digitized image data are loaded into the program. Input parameters may be supplied by the user, including the number of rows and columns of blocks on the array, and the number of rows and columns of spots in each block. To begin, subgroupings of spots ("blocks") (see FIG. 1) are located if present, first as rows of blocks, then as individual blocks.

The block-finding process is based on the premise that the gaps in fluorescence intensity which occur between blocks can be located by identifying troughs in a smoothed one-dimensional intensity profile obtained by averaging the intensity of fluorescence emission along rows or columns. However, both rotation and background noise, common characteristics of printed microarrays which are likely to be encountered on nearly every array, can significantly reduce the depth of the intensity profile troughs, so the invention uses two different methods to correct for these potential problems. To minimize the deleterious effect of rotation, rows of blocks along the shorter dimension of the image are found first, and then each row is analyzed to locate individual blocks within the row. To minimize the effect of noise, this invention uses an image enhancing filter known as the "Principal Frequency Filter" (PFF). This filter is defined in the following manner. The one-dimensional power spectrum is calculated for each row of pixels: the number of pixels in each row is increased to a power of 2 to allow a fast Fourier transformation (FFT) to be used. The FFT is calculated; and the power spectrum is computed by summing the squares of the real and imaginary components of the FFT. Next, the Principal Frequency is identified: the one-dimensional row power spectra are averaged across all rows of pixels in the image to compute the average row power spectrum; all peaks are located which occur in the average row power spectrum in neighborhoods of an optimal width, for example 2.5%, of the adjusted row dimension. The first non-zero local peak is the Principal Frequency, which is the spatial frequency determined by the repeating spot pattern. "Peaks" are defined either as local maxima within the defined neighborhood for a positive image, in which spots appear as bright areas on a dark background, or as local minima within the defined neighborhood for a negative image, in which spots appear as dark areas on a bright background. For simplicity, we refer to peaks as high values or local maxima in a positive image, but the alternative definition is also intended.

To use the Principal Frequency to find rows of blocks, an intensity profile at the principal frequency is computed for each row from the average of the individual row power spectra in a small neighborhood of the principal frequency. By using only the magnitude of the power spectrum at the principal frequency rather than the average fluorescence intensity for each row, all noise components different from the principal frequency are eliminated. Without removal of background fluorescence that is non-periodic, some high-intensity background areas of the array could be mistaken for spots. Thus use of the Principal Frequency Filter is essential for accurate block location.

The estimated spacing between spots can be determined from a cross-correlation of the image with itself. To use this method, the captured image is overlaid with an exact copy of itself, and the sum of the data at each pixel is calculated. For a one-dimensional cross-correlation to find row spacing, one copy of the image is shifted at one pixel intervals in the vertical dimension, and the sum of the two images at each pixel is calculated and averaged across all columns. The shift is repeated at least until a peak of intensity is identified which is more than a defined distance from the origin. The distance of that peak from the origin provides the row spacing measurement and identifies the major periodic component in the vertical dimension. As an alternative, this estimate may be computed from the Principal Frequency by dividing it into the adjusted row dimension.

The Principal Frequency intensity profile is then smoothed across rows by a value of 1.5 times the estimated row spacing to eliminate troughs between individual rows of spots. This generates a smoothed intensity profile along the long dimension of the array. To use the intensity profile to find rows of blocks, a threshold is identified for which there are threshold crossings in locations consistent with the predicted block size. The block size is estimated from the row spacing multiplied by the input number of rows in each block. These threshold crossings are defined to be boundaries at the edges of rows of blocks. FIG. 3 shows three views of the intensity profile from a hybridized microarray: the unmodified profile, the same profile subjected to smoothing, and the profile after principal frequency filtering and smoothing. Processing the intensity profile as described results in far more distinct discrimination of block edges and allows this thresholding effectively to find block edges. As FIG. 3 shows, block edges are far less marked in the unsmoothed profile, and attempts to use thresholding to locate these edges would be prone to error. The smoothing and filtering steps are thus essential for accurate block location.

Detect individual blocks within each row. Next, individual blocks are identified within each row of blocks using a similar approach, but seeking columns rather than rows. Each row of blocks is processed independently. The one-dimensional power spectrum is calculated for each column of pixels in the row of blocks. An average intensity is calculated from the one-dimensional power spectrum as described above for each row of pixels. Peaks in a neighborhood of a defined size, for example 2.5% of the width of the adjusted column dimension, are found, and the first local peak away from the zero frequency is identified as the Principal Frequency. A filtered intensity profile is computed and smoothed by a value of 1.5 times the estimated column spacing as described for rows, and a threshold is identified in the filtered column intensity profile for which there are crossings in locations consistent with the predicted block size. Block size is estimated from the column spacing multiplied by the input number of columns in each block. These calculations are carried out sequentially for each row of blocks to identify the edges of each and every block on the array.

Detect spots within each block. The next major step in spot location is to analyze each block for individual spots through use of a two-dimensional Principal Frequency filter, analogous to the one-dimensional filter used for locating blocks. This process is described briefly in the simplified overview flow chart [FIG. 2]. For accuracy and efficiency of computation, each block is treated separately in these calculations. For each block, a two dimensional forward Discrete Fourier Transform (DFT) is computed, and the power spectrum is calculated. The power spectrum is analyzed to find the local peaks that exist in a small two-dimensional neighborhood, for example, one defined as 2.5% of the total adjusted image size in each of the x and y dimensions. The nine highest of these local peaks are selected. The highest peak is at the origin; the remaining eight are generally situated in an approximately rectangular arrangement, the length of the sides of which are determined by the spacing of the spots on the array. Four of these peaks are on, or near, an x- or y-axis, and four are near the diagonals between axes. A visual depiction of the power spectrum, showing these peaks in a grayscale image, is found in FIG. 4. To create a filter, the method identifies the two peaks located closest to the positive axes and away from the origin by more than 2.5% of the image size. To perform the filtering step, all data in the complex DFT are set to 0 except those values within 2 pixels of one of these two peaks. The location and phase of the complex value of the DFT at the peaks is saved for later use. Using this modified DFT, a reverse Fourier transform is calculated to recreate an image of the array which includes only the signals with periodic intensity; this filtering process eliminates non-periodic noise. However, because all low-frequency content in the image has been eliminated, the periodic pattern of the spots is at this point extrapolated beyond the edges of the block, a situation which is corrected in a later step.

A basic, or predicted, grid, which provides predicted locations for spots in each block, is constructed from these coordinates. The basic grid is a lattice consisting of intersecting parallel row lines and parallel column lines. Mathematically, a lattice is defined as a set of points which are regularly spaced in two dimensions. To create the predicted grid, a 2×2 matrix is first formed from the four coordinate values of the two peaks. This matrix is then inverted. The four values in the inverse matrix define two vectors whose integral multiples generate the basic grid. The top left point of the basic grid is computed by correlating the image with with sine and cosine waves using the two generating vectors as wavelengths. The arctangent of the ratio of sine to cosine correlation numbers gives a phase value which can be translated into a starting point from which the grid can be generated. The basic grid is used later to make fine-scale adjustments to the location of spots.

Finally, intensity peaks are located in the filtered image of the block. A neighborhood is defined as an area equal to the row spacing by the column spacing (referred to as an "r×c neighborhood"). Peaks located in an r×c neighborhood are identified in the filtered image and are assigned to the closest point on the basic grid by the following procedure. A two-dimensional array, called the Grid Array, is created, with each element corresponding to one of the basic grid locations. Beginning in the center of the block image, local peaks in an r×c neighborhood are sought along the trajectory of a growing spiral. The location of each local peak is stored in the grid array element corresponding to the closest basic grid location. Beginning in the center of the image and searching for peaks on the perimeter of a square of increasing size, rather than carrying out the same operation from a corner of the image, results in more accurate peak location. When a peak is found, its coordinates are recorded in the Grid Array, again beginning in the center of the image. The first peak located is recorded in the center of the Grid Array. For subsequent peaks, the Grid Array elements which have been assigned are searched to find the one with the recorded peak location closest to the current peak. The location of the current peak is then stored in the Grid Array element adjacent to this closest preassigned Grid Array element. This process corrects for deviations of spot locations from the linear basic grid. The coordinates of the current peak are compared to those of the newly-found peak to assign each new peak to a distinct Grid Array element. Once all peaks have been located and assigned, the Grid Array is reviewed to identify any locations for which no peak was assigned, and these are then filled by interpolation from neighbors.

The application of two-dimensional Principal Frequency Filter to each block extrapolates the repeating spot pattern beyond the block edges, essentially erasing the edges of the blocks, which must be re-located at this point. To do so, the location of each peak stored in the grid array is made the center of a set of circles of radii varying from one pixel to one-half the row/column spacing. Average pixel intensity is calculated inside and outside each circle. The average intensities are accumulated for each row and column. The radius producing the highest intensity for each row is chosen, and new intensity profiles are created as in the earlier steps, except the intensities for each row are computed only for rows of spots rather than for rows of pixels. Edges of each block are identified in the same way as earlier, by finding intensity thresholds that correspond to locations consistent with the predicted size. This process of re-choosing the block edges using spot-row intensity profiles compensates for the extrapolation of spots beyond the edges of the blocks caused by the Principal Frequency Filter.

Completion of the spot-finding steps. Spot locations stored in the Grid Array within the bounds of the newly found block are written to a file and displayed on an image of the microarray. Locations may be correlated with identifying information which is unique for each spot. Such information may include a name or accession number which identifies the sequence of the nucleic acid in the original spot, other identification information such as in situ synthesis schemes, process information such as chemical or enzymatic modifications made to the spot after manufacture, or the like.

FIG. 5 is an image capturing system according to an embodiment of the present invention. Instruments are commercially available from several companies to capture two or more colors of fluorescence signals from a hybridized microarray. The instrument consists of laser light sources set to the appropriate excitation wavelengths for each of the fluorescent dyes used to tag the probes, an xy-movable stage which moves the microarray slide through the excitation beams, and detectors for each of the fluorescence emission wavelengths. Detectors include filters to exclude light of wavelengths other than those emitted by the probes, lenses to focus the emitted light, and often a photomultiplier to enhance the signals.

Operating environment for the invention. FIG. 6 is a simplified diagram of computer hardware according to an embodiment of the present invention. To summarize briefly the operating environment for the invention, the method is implemented in computer-executable instructions organized in program modules. The program modules contain all information and code to implement the processes described above. FIG. 6 shows a typical conformation of a computer that may be used to implement the invention, but there are many other computer system configurations which may be used, such as mainframe computers, multi-processor systems, microprocessor-based or programmable consumer electronics, and the like. The invention may also be implemented by distributed computing environments where steps are performed by remote processing devices that are linked through a communications network. Both local and remote memory storage devices may be used in a distributed computing environment.

The computer system shown in FIG. 6 includes a desktop computer, including a processing unit, system memories, devices for entering data into the computer, and an interface with a computer network. The computer may further include one or more hard disk drives, one or more magnetic disk drives to read from or write to removable disks, and an optical disk drive to read from or write to an optical disk such as a CD-ROM. The drives and their associated computer-readable media provide stable storage of data, data structures, computer-executable instructions, and other software components of the computer. Although the foregoing description refers to hard disks, removable magnetic disks, and optical disks, the computer-readable media may include other types of media such as magnetic cassettes, digital video disks, flash memory cards, and the like.

A number of program modules may be stored in the drives and RAM, including an operating system, one or more application programs, other program modules, and program data. A user may enter commands and information into the computer through a keyboard and pointing device such as a mouse, but other input devices may also be used, including joysticks, scanners, microphones, or the like. These and other input devices are often connected to the processing unit through a universal serial bus, parallel port, serial port, or other interface coupled to the system bus. A monitor or other display device is connected to the system bus via a display controller, video adapter, or other interface. The computer may operate in a networked environment using connections to one or more remote computers, which may be servers, routers, peer devices, or other types of network node. Such remote devices typically include many or all of the elements described relative to the workstation computer described above. Logical connections may include local area networks and wide area networks. Such networking environments are commonplace in laboratories, offices, intranets, and the Internet. When used in a LAN networking environment, the computer is connected to the local network through a network interface or adapter. When used in a WAN networking environment, the computer typically includes a modem or other means for establishing communications over the wide area network, such as an intranet or the Internet. In a networked environment, program modules, or portions thereof, may be stored in the remote memory storage device. Such network connections are merely examples and other means of establishing a communications link between the computers may be used.

Although the above has been described in terms of specific system hardware features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. One of ordinary skill in the art would recognize many variations, modifications, and alternatives.

The system is merely provided to show an example of a way of implementing the present invention. It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for processing data in digitized images of biological microarrays to identify one or more groupings of spots present in the microarray, the method comprising:

importing a captured digitized image of a biological microarray of spots in an electronic format, the array comprising a plurality of approximately rectangular groupings of spots, called blocks, the groupings being defined by 1 through N, where N is an integer greater than 1, the blocks being arranged in a regular pattern, with rows and columns of blocks being separated by substantially horizontal and vertical isolation regions comprising background, the background regions being long, narrow areas approximating a rectangular shape, which are substantially free from any spots;

processing the captured image to reduce background noise from the captured image;

identifying at least the isolation region between the groupings in the captured image using a frequency domain filter applied to the captured image, the filter being constructed according to periodic components of the captured image, the periodic components being defined by a spatial distribution of the spots in the captured image of the microarray;

determining the locations of the boundaries of the groupings in the captured image of the biological microarray to isolate any one of the groupings from any one of the other groupings; and storing the locations of the boundaries of the groupings in the captured image of the biological microarray into memory.

2. The method of claim 1 wherein the filter is derived from a one- or multi-dimensional power spectrum from a Fourier transform process.

3. The method of claim 1 wherein the isolation regions are identified along a first dimension axis of the image and subsequently along the second dimension axis of the image.

4. The method of claim 1 wherein the locations of the boundaries of the blocks are determined from the filtered image by computing intensity profiles, the intensity profiles being calculated by summing pixel values along rows or columns, smoothing said intensity profile, and identifying a threshold value which the smoothed intensity profile crosses at locations consistent with estimated block size.

5. The method of claim 1 further comprising locating each of the spots in the isolated block using a filter applied to the captured image of the isolated block, the filter being defined according to periodic components of the captured image of the isolated block.

6. The method of claim 1 wherein the means for executing the method of claim 4 is provided in one or more computer systems.

7. A method for processing data in a captured image of a biological microarray to identify the location of one or more spots defined in the microarray image, the method comprising:

importing a captured digitized image of a biological microarray of spots in an electronic format, the array comprising a plurality of spots on a substrate material, the spots being defined by 1 through N, where N is an integer greater than 1, the spots being approximately equal in size and shape, the spots having been placed on the microarray in a predefined pattern which approximates a two dimensional lattice, each of the spots being identified by its row and column location in said lattice, each of the spots being provided on a background region, the spots generally distinguishable from the background region in the image by having higher values than the background in the case of a positive image or lower values than the background in the case of a negative image;

enhancing the electronic image to improve the visibility of the spots against the background region;

identifying the locations of the spots in the captured image by searching the enhanced electronic image for its local peak values;

relating the identified location of each spot to its row and column location in the two dimensional grid by predicting each spot's location from information about said grid and matching identified locations with predicted locations; and relating the one or more spots to respective one or more identifier information whereupon the identifier information uniquely identifies the spot.

8. The method of claim 7 wherein the identifier information is characterized as location information for the spot on the array.

9. The method of claim 8 wherein the identifier information is associated with process information for the spot, the process information being provided in one or more memories.

10. The method of claim 7 wherein the image enhancement is achieved by applying a filter to the captured image of the biological microarray, the filter being defined according to a periodic component of the spots in the captured image of the biological microarray.

11. The method of claim 10 wherein the filter is a principal frequency filter, said filter being constructed by selecting two of the strongest spatial-frequency components and eliminating other components of the captured image.

12. The method of claim 11 wherein the principal frequency filter is derived from a one-dimensional power spectrum or multidimensional power spectrum of a Fourier transform process.

13. The method of claim 7 wherein the relating of spots to identifier information is derived by means of a predicted grid, said grid being used as a map to predict locations of spots and to relate predicted locations to actual locations.

14. The method of claim 13 wherein the predicted grid is constructed from the two peak frequency components identified in the principal frequency filter by a matrix inversion calculation.

15. The method of claim 13 wherein predicted grid locations are related to actual spot locations by assigning each actual spot location to its nearest predicted grid location.

16. The method of claim 15 wherein a predicted spot location is related to its actual spot location by identifying the nearest neighboring location in the predicted grid to which a spot has already been assigned, and assigning the spot to the next location.

17. The method of claim 16 wherein the assignment of actual spot locations starts in the center of the image and proceeds outward from the center in a growing spiral.

18. A system for processing data in captured digitized images of biological microarrays to identify the location of one or more spots defined in the microarray image, the system comprising one or more memories, the one or more memories including:

a code directed to receiving a captured image of a biological microarray of spots in an electronic format, the array comprising a plurality of spots on a substrate material, the spots being defined by 1 through N, where N is an integer greater than 1, the spots being approximately equal in size and shape, the spots having been placed on the microarray in a predefined pattern which approximates a two dimensional lattice, each of the spots being identified by its row and column location in said lattice, each of the spots being provided on a background region, the spots generally distinguishable from the background region in the image by having higher values than the background in the case of a positive image or lower values than the background in the case of a negative image;

a code directed to enhancing the electronic image to improve the visibility of the spots against the background region;

a code directed to identifying the locations of the spots in the captured image by searching the enhanced electronic image for its local peak values;

a code directed to relating the identified location of each spot to its row and column location in the two dimensional grid by predicting each spot's location from information about said grid and matching identified locations with predicted locations; and a code directed to relating the one or more spots to respective one or more identifier information whereupon the identifier information uniquely identifies the spot.

19. The method of claim 18 wherein the image enhancing code is directed to calculate the principal frequency of one or more periodic components of the image, that principal frequency being used to construct the filter.

20. The method of claim 19 wherein the principal frequency filter code is directed to derive the filter from a one-dimensional power spectrum or multidimensional power spectrum of a Fourier transform process.

21. The method of claim 18 wherein the code directed to relate the one or more spots to respective one or more identifier information operates by means of a predicted grid, said grid being used as a map to predict locations of spots and to relate predicted locations to actual locations.

22. The method of claim 21 wherein the code directed to construct the predicted grid derives grid characteristics from the two-dimensional frequency and phase information of the two peak frequency components identified in the principal frequency filter.

23. The method of claim 21 wherein the code directed to construct the predicted grid derives grid characteristics from a cross correlation of the original image with itself.

24. The method of claim 21 wherein the code directed to relate predicted grid locations to actual spot locations operates by assigning each actual spot location to its nearest predicted grid location.

25. The method of claim 24 wherein the code directed to relate a predicted spot location to an actual spot location operates by identifying the nearest neighboring location in the predicted grid to which a spot has already been assigned, and assigning the spot to the next location.

26. The method of claim 24 wherein the code directed to assign actual spot locations operates by starting in the center of the image and proceeding outward from the center in a growing spiral.

27. A method for processing data in biological microarrays to identify one or more spots defined in the microarray, the method comprising:

importing a captured digitized image of a biological microarray of spots in an electronic format, the array comprising a plurality of spots on a substrate material, the spots being defined by 1 through N, where N is an integer greater than 1, the spots being approximately equal in size and shape, the spots having been placed on the microarray in a pattern which approximates a two dimensional grid, each of the spots being identified by its row and column location in said grid, each of the spots being provided on a background region, the background region including a covered region occupied by spots and an uncovered region being substantially free from any spots;

mathematically defining a filter based on the principal frequency of the repeating spot grid;

applying the filter to the captured image of the biological microarray to derive an enhanced image of the captured image, the filter being applied to enhance a spatial characteristic of the captured image;

processing the enhanced image to identify spatial positions of the spots in the captured image; and relating the spatial positions of the spots to respective identifier information whereupon the identifier information uniquely identifies each of the spots.

28. The method of claim 27 wherein the filter is a principal frequency filter which identifies two or more spatial frequency components of an intensity higher than other frequency components that form the captured image.

29. The method of claim 28 wherein the step of defining the principal frequency filter is provided using a Fourier transform process.

30. The method of claim 27 wherein the relating of spots to identifier information is derived by means of a predicted grid, said grid being used as a map to predict locations of spots and to relate predicted locations to actual locations.

31. The method of claim 30 wherein the predicted grid is constructed from the two-dimensional frequency and phase information from the two peak frequency components identified in the principal frequency filter.

32. The method of claim 30 wherein the predicted grid is constructed from a cross correlation of the original image with itself.

33. The method of claim 30 wherein predicted grid locations are related to actual spot locations by assigning each actual spot location to its nearest predicted grid location.

34. The method of claim 33 wherein a predicted spot location is related to its actual spot location by identifying the nearest neighboring location in the predicted grid to which a spot has already been assigned, and assigning the spot to the next location.

35. The method of claim 34 wherein the assignment of actual spot locations starts in the center of the image and proceeds outward from the center in a growing spiral.

36. The method of claim 27 in the processing comprises locating a local peak of intensity associated with a portion of the captured image, the local peak of intensity being associated with one of the spots in the captured image.

37. The method of claim 27 wherein the filter is a frequency domain filter derived from the two dimensional power spectrum of the captured image.

38. The method of claim 27 wherein the identifier information comprises at least location information for the spot on the array.

39. A system for processing data in biological microarrays to identify one or more spots defined in the microarray, the system comprising one or more memories, the one or more memories including:

a code directed to receiving an image of a biological microarray of spots in an electronic format, the array comprising a plurality of spots on a substrate material, the spots being defined by 1 through N, where N is an integer greater than 1, the spots having been placed on the substrate material in a pattern approximating a two dimensional grid, each of the spots being identified by its row and column location in said grid, each of the spots being provided on a background region, the background region including a covered region occupied by spots and an uncovered region being substantially free from any spots;

a code directed to applying a filter to the captured image of the biological microarray to derive an enhanced image of the captured image, the filter being applied to enhance a spatial characteristic of the captured image;

a code directed to identifying the locations of the spots by searching the enhanced electronic image for its highest values;

a code directed to constructing a predicted spot location grid from frequency and phase information from the enhanced spatial characteristics of the captured image; and a code directed to processing the enhanced image to identify spatial positions of the spots in the captured image.

40. The system of claim 39 further comprising a code directed to relating the spatial positions of the spots in the captured image to respective identifier information whereupon the identifier information uniquely identifies each of the spots.

41. The system of claim 40 comprising a code directed to relating the spatial positions of spots in the captured image by means of a predicted grid, said grid being used as a map to predict locations of spots and to relate predicted locations to actual locations.

42. The system of claim 41 comprising a code directed to constructing the predicted grid by deriving grid coordinates from the two-dimensional frequency and phase information of the two principal frequency components.

43. The system of claim 41 comprising a code directed to constructing the predicted grid by deriving grid coordinates from a cross-correlation of the captured image with itself.

44. The system of claim 40 comprising a code directed to relating predicted grid locations to actual spot locations by assigning each actual spot location to its nearest predicted grid location.

45. The system of claim 40 comprising a code directed to relating a predicted grid spot location to actual spot location by identifying the nearest neighboring location in the predicted grid to which a spot has already been assigned, and assigning the spot to the next location.

46. The system of claim 40 comprising a code directed to assigning actual spot locations by starting in the center of the image and proceeding outward from the center in a growing spiral.

47. The system of claim 39 wherein the filter is a principal frequency filter defined by identification of two or more spatial frequency components of higher intensity than other frequency components that form the captured image, and eliminating other components of the captured image, the principal frequency filter being provided using a multidimensional power spectrum from a Fourier transform process.

48. A method for processing data in biological microarrays to identify one or more spots defined in the microarray, the method comprising:

providing an image of a biological microarray of spots in an electronic format, the image being a captured image, the array comprising a plurality of spots on a substrate material, the spots being defined by 1 through N, where N is an integer greater than 1, the spots having been placed on the microarray in a pattern approximating a two dimensional grid, each of the spots being identified by its row and column location in said grid, each of the spots being provided on a background region, the background region including a covered region occupied by spots and an uncovered region being substantially free from any spots;

processing a two dimensional representation associated with the captured image of the biological microarray using a processing filter to provide an enhanced image of the captured image, the filter being derived from a two dimensional power spectrum of the two dimensional representation associated with the captured image by selecting two of the strongest non-zero frequency components and removing other frequency components outside of a frequency domain region associated with the two of the strongest non-zero frequency components;

processing the enhanced image to identify spatial positions of the spots in the captured image; and relating the spatial positions of the spots to respective identifier information whereupon the identifier information uniquely identifies each of the spots.

49. The method of claim 48 wherein the frequency domain region is a frequency domain neighborhood of two of the strongest non-zero frequency components.

* * * * *